(12) United States Patent
Smith et al.

(10) Patent No.: US 7,942,438 B2
(45) Date of Patent: May 17, 2011

(54) AIRBAG WITH STOP LEAK MATERIAL

(75) Inventors: Bradley W. Smith, Plain City, UT (US); Michael P. Jordan, South Weber, UT (US); Brent Parks, Englewood, CO (US)

(73) Assignee: Autoliv ASP, Inc., Ogden, UT (US)

( * ) Notice: Subject to any disclaimer, the term of this patent is extended or adjusted under 35 U.S.C. 154(b) by 375 days.

(21) Appl. No.: 12/050,829

(22) Filed: Mar. 18, 2008

(65) Prior Publication Data
US 2009/0236835 A1    Sep. 24, 2009

(51) Int. Cl.
*B60R 21/16*    (2006.01)
(52) U.S. Cl. ............... 280/728.1; 280/730.2; 280/743.1

(58) Field of Classification Search ............... 280/728.1, 280/743.1, 730.2, 749
See application file for complete search history.

(56) References Cited

U.S. PATENT DOCUMENTS

| | | | |
|---|---|---|---|
| 3,853,334 A * | 12/1974 | Auman et al. | 280/728.3 |
| 5,658,674 A | 8/1997 | Lorenzetti et al. | |
| 6,012,738 A | 1/2000 | Beisswenger | |
| 7,699,342 B2 * | 4/2010 | Goto | 280/730.2 |

* cited by examiner

*Primary Examiner* — Eric Culbreth
(74) *Attorney, Agent, or Firm* — Sally J. Brown; Stoel Rives LLP (57) ABSTRACT

An inflatable cushion assembly for deployment in a vehicle. The assembly has an inflator, an inflatable cushion, and particles of a stop leak material. Upon deployment, the stop leak material becomes temporarily dispersed by and suspended in inflation gas such that the cushion is rendered less porous to inflation gas.

36 Claims, 10 Drawing Sheets

AIRBAG WITH STOP LEAK MATERIAL

TECHNICAL FIELD

The present invention relates generally to the field of automotive protective systems. More specifically, the present invention relates to a system for dynamically sealing an airbag such that the airbag is less porous to inflation gas.

BRIEF DESCRIPTION OF THE DRAWINGS

Understanding that drawings depict only typical embodiments of the invention and are not therefore to be considered to be limiting of its scope, the invention will be described and explained with additional specificity and detail through the use of the accompanying drawings in which.

INDEX OF ELEMENTS IDENTIFIED IN THE DRAWINGS 100 inflatable cushion assembly
110 inflatable curtain cushion
111 inflation cell
115 throat portion
116 seam
118 inflation gas
120 inflator
122 inflator tubes
123 cushion proximal end of inflator tube
130 stop leak material
131 particle of stop leak material
132 short side of particle
134 long side of particle
400 inflatable cushion assembly
410 inflatable curtain cushion
415 throat portion
416 stitching
417 tear stitching
420 inflator
422 inflator tubes
423 cushion proximal end of inflator tube
430 stop leak material
500 inflatable cushion assembly
510 inflatable curtain cushion
515 throat portion
520 inflator
522 inflator tube
523 throat portion proximal end
525 aperture
530 stop leak material
550 inflator tube cover
600 inflatable cushion assembly
610 inflatable curtain cushion
615 throat portion
620 inflator
622 inflator tube
623 cushion proximal end of inflator tube
630 stop leak material
660 inflator tube plug
700 inflatable cushion assembly
710 inflatable curtain cushion
715 throat portion
720 inflator
722 inflator tube
723 cushion proximal end of inflator tube
730 stop leak material
770 wrapper
800 inflatable cushion assembly
810 inflatable curtain cushion
815 throat portion
820 inflator
822 inflator tube
823 cushion proximal end of inflator tube
830 stop leak material
870 wrapper
880 diffuser
900 inflatable cushion assembly
910 inflatable curtain cushion
911 inflation cell
915 throat portion
916 seam
917 tear stitching
920 inflator
930 stop leak material
940 throat liner
944 inflation tube
945 cushion proximal end of inflator tube
946 diffuser
944 coupler
945 first exit of liner
946 second exit of liner
1000 inflatable cushion assembly
1010 inflatable curtain cushion
1011 inflation cell
1015 throat portion
1016 seam
1020 inflator
1030 stop leak material
1040 throat liner
1044 coupler
1045 first exit
1046 second exit
1100 inflatable cushion assembly
1110 inflatable curtain cushion
1111 inflation cells 1115 throat portion
1116 seam
1120 inflator
1130 stop leak material
1140 throat liner
1144 coupler
1145 first exit
1146 second exit

DETAILED DESCRIPTION

Described below are embodiments of apparatus, methods, and systems for inflatable curtain venting. In the following description, numerous specific details are provided for a thorough understanding of the embodiments of the invention. However, those skilled in the art will recognize that the invention can be practiced without one or more of the specific details, or with other methods, components, materials, etc.

In addition, in some cases, well-known structures, materials, or operations are not shown or described in detail in order to avoid obscuring aspects of the invention. Furthermore, the described features, structures, or characteristics may be combined in any suitable manner in one or more embodiments. In the following figures, similar components depicted in different figures may have similar reference numbers.

The phrases "connected to", "coupled to" and "in communication with" refer to any form of interaction between two or more entities, including mechanical, electrical, magnetic, electromagnetic, fluid and thermal interaction. Two components may be coupled to each other even though they are not in direct contact with each other. The phrases "attached to" or "attached directly to" refer to interaction between two or more entities which are in direct contact with each other or are separated by a fastener.

Inflatable cushion systems are widely used to minimize occupant injury in a collision scenario. Cushion modules have been installed at various locations within a vehicle, including, but not limited to, the steering wheel, the instrument panel, within the side doors or side seats, adjacent to roof rail of the vehicle, in an overhead position, and at the knee or leg position. In the following disclosure, "airbag" may refer to an inflatable curtain airbag, overhead airbag, front airbag, or any other airbag type.

Inflatable curtain cushions typically extend longitudinally within the vehicle and are usually coupled to or next to the roof rail of the vehicle. In an undeployed state, inflatable curtain cushions are typically rolled, folded, or a combination of both, and retained in the undeployed configuration by wrapping at attachment points, or by being enclosed in a sock. In a deployed state, an inflatable curtain cushion may cover at least a portion of the side windows and the B-pillar of the vehicle. In some embodiments, inflatable curtain cushions may extend from the A-pillar to the C-pillar of the vehicle. In alternative embodiments, inflatable curtain cushions may extend from the A-pillar to the D-pillar of the vehicle.

In a collision event, the inflatable curtain cushion may be inflated by an inflator and changes conformation from rolled and/or folded to an extended deployed state. The amount of gas from the inflator that is retained within the inflatable curtain determines how hard or soft the cushioning of the curtain will be.

Inflatable curtain cushions may be configured to serve two functions: cushioning and anti-ejection. During a collision event, the curtain may cushion the head and upper body of an occupant, and during a roll-over event, the cushion may function to help retain the occupant within the vehicle. These two functions require significantly different time-scales. Typically, inflatable curtains are configured to provide cushioning during a side impact event for about 500 milliseconds. However, during a roll-over event, the inflatable curtain may need to cushion an occupant and protect against occupant ejection for an extended length of time, such as, up to seven seconds. Inflatable curtain cushions help mitigate the risk of occupant ejection by forming a barrier between the occupant and the side windows.

Inflation gas retention for an extended length of time, such as, up to seven seconds can be accomplished by manufacturing an inflatable curtain using high thread-count fabrics, sealed seams, and fabrics that have been coated with a substance that makes the fabric less porous to inflation gas. However, these manufacturing practices are more expensive than those required for gas retention for a shorter length of time, such as about 500 milliseconds.

It would be advantageous to provide an inflatable cushion that could efficiently fulfill the dual functions of occupant cushioning and occupant retention without the high cost of manufacturing the entire inflatable curtain from using the more expensive practices. Embodiments disclosed below provide a reduced-cost inflatable cushion assembly that comprises a particulate sealing material, which may seal the inflatable cushion such that the cushion may retain inflation gas for up to about seven seconds.

Figure 1:
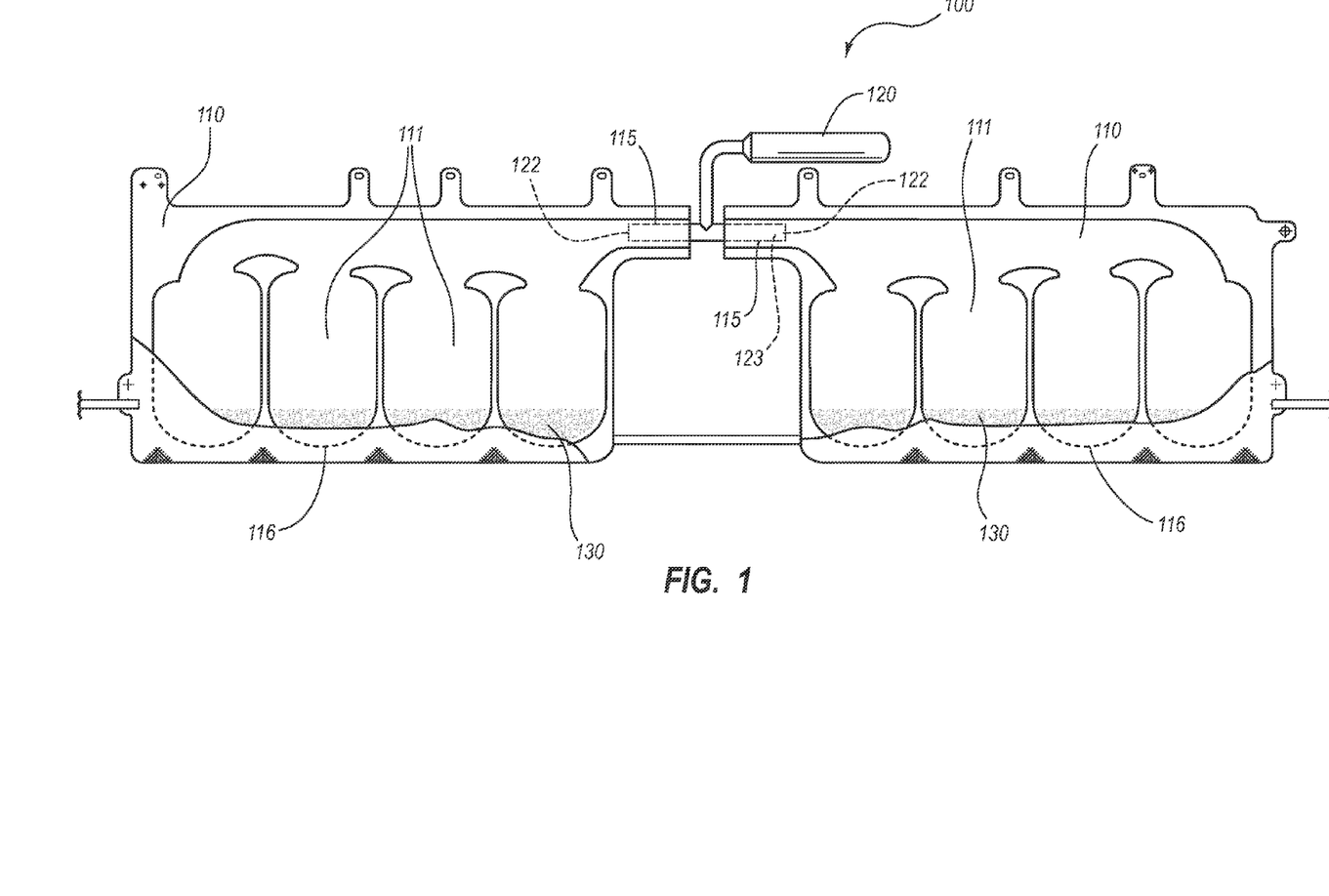
FIG. 1 is a side elevation partial cutaway view of an inflatable cushion assembly.

FIG. 1 represents one embodiment of an inflatable cushion assembly 100 from a side elevation view, wherein the assembly is depicted in an extended configuration. Cushion assembly 100 may comprise an inflatable curtain cushion 110, an inflator 120, and a stop leak material 130.

The shape of inflatable cushion 110 depicted in FIG. 1 is for illustrative purposes only, and may be altered. The inflatable cushions disclosed herein are depicted as inflatable curtain cushions; however, one skilled in the art will recognize that any type of inflatable cushion may be used. For example cushion 110 and other cushions disclosed herein may be a front driver airbag cushion, a front passenger airbag cushion, or a side airbag cushion located in the front or rear of a vehicle.

Inflatable curtain cushion 110 may be configured to fit within the side window wells of a vehicle. Curtain 110 may comprise a contiguous piece of material manufactured using a one-piece woven technique or may be manufactured by cutting and sewing two pieces of a nylon material, which is well known in the art. The material forming the cushion may be coated with a substance to reduce the porosity of the cushion. Curtain 110 may be anchored to a vehicle structure via mounting tabs disposed on the outer edge of curtain 110 and by tethers, which may be coupled to curtain 110 by sewing, gluing, RF welding or by any other suitable technique. Further, tethers may comprise extensions of curtain 110 and may be anchored to vehicle structures, such as an A-pillar and a D-Pillar.

Curtain 110 comprises a first side and a second side of material, forming a void between them, into which inflation gas may be forced thereby inflating the curtain. The void may comprise one or more inflation cells 111, one or more throat portions 115, or a combination of one or more inflation cells 111 and throat portions 115. Thus, the void comprises the inflatable portions of inflatable curtain cushion 110.

Inflation cells 111 may be defined by seams 116 and are configured to receive inflation gas from inflator 12 and to cushion an occupant in a collision or roll-over event. The shape of inflation cells 111 as depicted in FIG. 1 are strictly for illustrative purposes and may vary according to vehicle application. Seams 116 may comprise stitching as depicted in FIG. 1, or alternatively they may be formed by gluing, weaving, RF welding or by any other suitable technique. Seams 116 may comprise air-tight seams, or may comprise non-sealed seams such that inflation gas may escape through seams 116.

Throat portions 115 may be defined by seams 116 and are configured to receive inflation gas from inflator 120 and channel the inflation gas to inflation cells 111. Inflatable curtain cushion 110 may comprise one or at least two throat portions 115, wherein the throat portions 115 may be configured to be anchored to inflator tubes 122 or they may be coupled to the inflator tubes 122. Additionally, throat portions 115 may comprise air-tight seals to inflator tubes. In alternative embodiments, inflatable curtain cushion 110 may lack throat portions 115, or the shape of throat portion 115 may vary depending on application.

Inflator 120 may be anchored to a roof rail, and may be either a pyrotechnic device, or a stored gas inflator. Inflator 120 is in electronic communication with vehicle sensors which are configured to detect vehicle collisions and rollovers; upon detection of predetermined conditions, the sensors activate the inflator and inflatable curtain cushion 110 is rapidly inflated.

Inflator 120 may comprise inflator tubes 122, which act as conduits through which inflation gas travels from the inflator to the void formed by the two sides of inflatable curtain cushion 110. Inflator tubes may comprise a metal or metal alloy, or alternatively may comprise any other suitable material.

Inflator tubes 122 further comprise a curtain cushion proximal end 123, which comprises an aperture that may be defined by the inner surface of inflator tube 122, wherein the aperture is positioned within the lumen of tube 122 through which inflation gas passes during inflator activation.

Stop leak material 130 may be freely dispersed into inflation cells and gas guides 111 and 115 prior to inflatable curtain cushion assembly in a vehicle. FIG. 1 depicts the stop leak material as being settled in the bottom of inflation cells 111, however in alternative embodiments, the stop leak material may be more evenly dispersed throughout inflation cells and throat portions 111 and 115. Curtain cushion 110 may then be folded in a manner such that stop leak material 130 remains distributed throughout the voids in curtain cushion 110. FIG. 1 does not depict the behavior of stop leak material 130 during inflatable curtain cushion 110 deployment.

Stop leak material 130 may comprise a particulate material, in which the particles comprise a substantially flattened shape. Stop leak material 130 may be described as being flakes with a planar shape. In alternative embodiments, the particles of stop leak material may be of such a size that the stop leak material may be described as being a powder.

Stop leak material 130 may comprise inorganic particles with a mesh size range of between 6 and 100. Table 1 lists stop leak particle sizes in sieve number, mesh size, Microns, millimeters (mm), mils, and inches. Sieve number represents ISO 3310-1 standard US Sieve Size. Mesh size represents Tyler mesh size (ASTM E11 standard).

The figures listed in Table 1 may represent an average particle size, a mode of particle sizes, or a maximal particle size. For example, mesh size 6 may indicate that an average particle has a mesh size of 6, or it may indicate that the most common particle size is mesh size 6. Alternatively, mesh size 6 may represent a maximal particle size present in the material.

As will be appreciated by one skilled in the art, a population of particles having a given mesh size may in fact represent a range of mesh sizes such that the population actually represents a distribution of mesh sizes. In such a case, some of the particles within a population of a given mesh size 6 may not be useful for blocking gas exit via apertures in an inflatable cushion. Thus, one or more fractionation techniques may be employed such that particles present in airbag assembly 100 range from about mesh size 6 to about mesh size 100. Further, a particle size distribution present in airbag assembly may be from about mesh size 8 to about mesh size 30.

One skilled in the art will recognize that it is not necessary that stop leak material 130 comprise either a single mesh size of particles or a range of particle mesh sizes. Rather, it is intended that the size or size range of stop leak particles can be varied to meet different stop leak requirements for different configurations, embodiments, and techniques associated with the manufacture, application, and deployment of inflatable cushions.

TABLE 1

| Sieve no. | Mesh Size | Microns | Mm | Mils | Inches |
| --- | --- | --- | --- | --- | --- |
| 4 | 4 | 4760 | 4.760 | 187.5 | 0.1875 |
| 6 | 6 | 3360 | 3.360 | 152.3 | 0.1523 |
| 8 | 8 | 2380 | 2.380 | 93.7 | 0.0937 |
| 12 | 10 | 1680 | 1.680 | 66.1 | 0.0937 |
| 14 | 12 | 1410 | 1.410 | 55.5 | 0.0555 |
| 16 | 14 | 1190 | 1.190 | 46.8 | 0.0468 |
| 18 | 16 | 1000 | 1.000 | 33.0 | 0.0333 |
| 20 | 20 | 840 | 0.840 | 33.1 | 0.0331 |
| 25 | 24 | 710 | 0.710 | 27.9 | 0.0279 |
| 30 | 28 | 590 | 0.590 | 23.2 | 0.0232 |
| 35 | 32 | 500 | 0.500 | 19.7 | 0.0197 |
| 40 | 35 | 420 | 0.420 | 16.5 | 0.0165 |
| 45 | 42 | 350 | 0.350 | 13.7 | 0.0137 |
| 50 | 48 | 297 | 0.297 | 11.7 | 0.0117 |
| 60 | 60 | 250 | 0.250 | 9.8 | 0.0098 |
| 70 | 65 | 210 | .021 | 6.9 | 0.0069 |
| 80 | 80 | 177 | 0.177 | 5.9 | 0.0059 |
| 100 | 100 | 149 | 0.149 | 4.9 | 0.0049 |
| 120 | 115 | 125 | 0.125 | 4.1 | 0.0041 |

Stop leak material may also be resistant to agglomeration such that under conditions of 95% relative humidity and 90° C. the stop leak material may not stick together and may still be dispersed and become suspended when exposed to an inflation gas stream generated by an inflator such as inflator 120. Additionally, stop leak material 130 may not become agglomerated when exposed to 107° C. or when exposed to temperature cycling within a range of −40° C. and +107° C.

By way of example, and not of limitation, stop leak material may have a bulk density of 0.17 to 0.20 Kilograms per Liter and a thermal conductivity of less than 1 k-(W/m K). In one embodiment, stop leak particles may have a length to thickness ratio from about 2:1 to about 25:1 or higher and a melting point of about 1300° Celsius.

In one embodiment, the stop leak material 130 comprises particles of Potassium Aluminum Silicate $KAl_2(AlSi_3O_{10})(F, OH)_2$), also known as Muscovite Mica or a variant of Muscovite Mica called Fuchsite Mica. In this embodiment the Muscovite Mica flakes have all of the above listed physical properties and a size between 6 and 100 mesh. In other embodiments, other types of Mica flakes may be used such as Biotite, Lepidolite, Glauconite, Paragonite, Phlogopite, Zinnwaldite, or one of the Clay Micas, including Hydro-Muscovite Mica, Illite Mica, or Phengite Mica. Further, stop leak material 130 may comprise any combination of any of the above reference Micas, or other types of Micas not referenced here. In addition to Mica, stop leak material 130 may comprise any lightweight mineral or chemical material, such as flaked or powdered ceramics, glass, plastic, or plant material.

During a collision or roll-over event, vehicle sensors may activate inflator 120 such that inflatable curtain cushion 110 changes conformation from a stored configuration to a deployed configuration as throat portions 115 and inflation cells 111 are rapidly filled with inflation gas. Stop leak material is configured to readily become temporarily dispersed by and suspended in the inflation gas during inflatable curtain cushion 110 deployment such that throat portions 115 and inflation cells 111 may be filled with inflation gas borne stop leak particles 130. A path of inflation gas travel exists starting at inflator 120, extending to inflator tubes 122 (if present), throat portion 115 (if present) and ending at the bottom of inflation cell 111.

Stop leak material 130 may become temporarily dispersed in response to one or a combination of factors. For example, stop leak material 130 may be directly in a path of inflation gas flow as inflation gas travels from inflator 120, inflator tubes 122, throat portion 115, and into inflation cells 111 such that sop leak particles 130 become temporarily suspended in the inflation gas. Alternatively, the change in conformation of inflatable curtain cushion 110 from a rolled and/or folded configuration to an extended conformation may help to distribute stop leak material 130 throughout cushion 110. As deployment of curtain cushion 110 is turbulent, both in relation to the flow of inflation gas and the change of conformation of cushion 110, stop leak material 130 may tend to become temporarily dispersed and suspended in the inflation gas such that particles of stop leak material are temporarily suspended within and dispersed throughout the voids comprising throat portions 115 and inflation cells 111.

Due to the nature of its storage and deployment, inflatable curtain cushion 110 may develop leaks that will allow inflation gas to escape during and after deployment. Gas leaks may cause cushion 110 to be prematurely reduced to ambient air pressure before a predetermined period of time. This may be true regardless of whether cushion 110 was manufactured with sealed seams, or whether cushion 110 was coated with a sealing compound to make the material from which cushion 110 was manufactured less porous to inflation gas, or a combination of these techniques. Additionally, to reduce manufacturing costs, curtain cushion 110 may have been manufactured without using sealed seams or a sealing compound. In either case, stop leak material 130 may reduce the rate of inflation gas loss, and thereby help to maintain curtain cushion 110 at a predetermined acceptable range of pressure for a predetermined time.

Stop leak material 130 may reduce the rate of inflation gas loss by covering apertures that are either inherent in the woven material of curtain cushion 110, are produced during manufacturing, or develop during curtain cushion 110 deployment, or are a combination of the above. Additionally, stop leak material 130 may become intercalated within the apertures, or may reduce the rate of inflation gas loss by a combination of covering and intercalation. Apertures produced during manufacturing of curtain cushion 110 include apertures between stitches securing two pieces of material together and apertures between an individual stitch and the material. Additional apertures may be those formed as fabric sides are woven together as in one piece woven designs wherein the weaving process integrally forms the two sides of the curtain.

Thus, stop leak material 130 may be used with a curtain cushion that has a coating material to reduce inflation gas porosity, and that has sealed seams. In this case, stop leak material may be used, such that it primarily seals gas leaks that develop due to curtain cushion storage and deployment. Alternatively, stop leak material 130 may be used in combination with an inflatable curtain cushion that has little or no coating in combination with unsealed or partially sealed seams. In this case, a greater amount of stop leak material 130 may be used such that the material coats the interior surfaces of the inflatable void of a curtain cushion.

The amount of stop leak material 130 to be used varies according to different applications and partially depends of the volume of the airbag cushion to be used in combination with the stop leak material. By way of example and not of limitation, the amount of Muscovite Mica flake used may vary between about 0.1 gram per Liter of cushion 110 inflation volume and 1.0 gram per liter.

Figure 2:
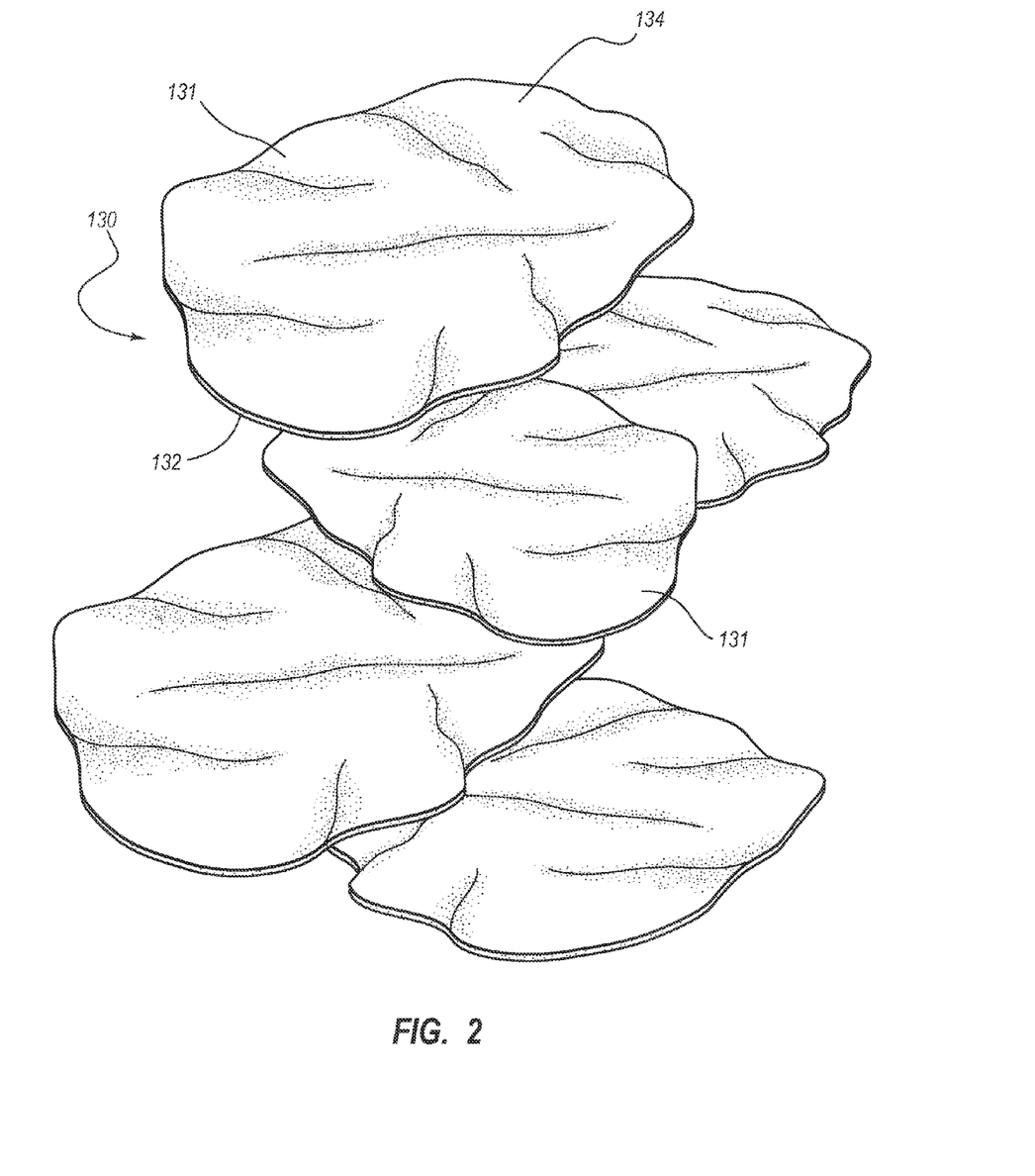
FIG. 2 is a front elevation view of particles of stop leak material from FIG. 1.

FIG. 2 depicts a perspective view of a particle 131 of stop leak material 130 from FIG. 1. In this view, the relative relationships between the particle's length, width, and height are visible. Stop leak particle 131 is generally representative of particles comprising stop leak material 130; however, the exact shape of particle 131 will vary from particle to particle. Particle 131 comprises a flattened, planar shape wherein a length of a long side 134 of a particle is substantially greater than a length of a short side 132. For example, stop leak particle 131 may have a length to thickness ratio from about 2:1 to about 25:1 or greater.

Figure 3A:
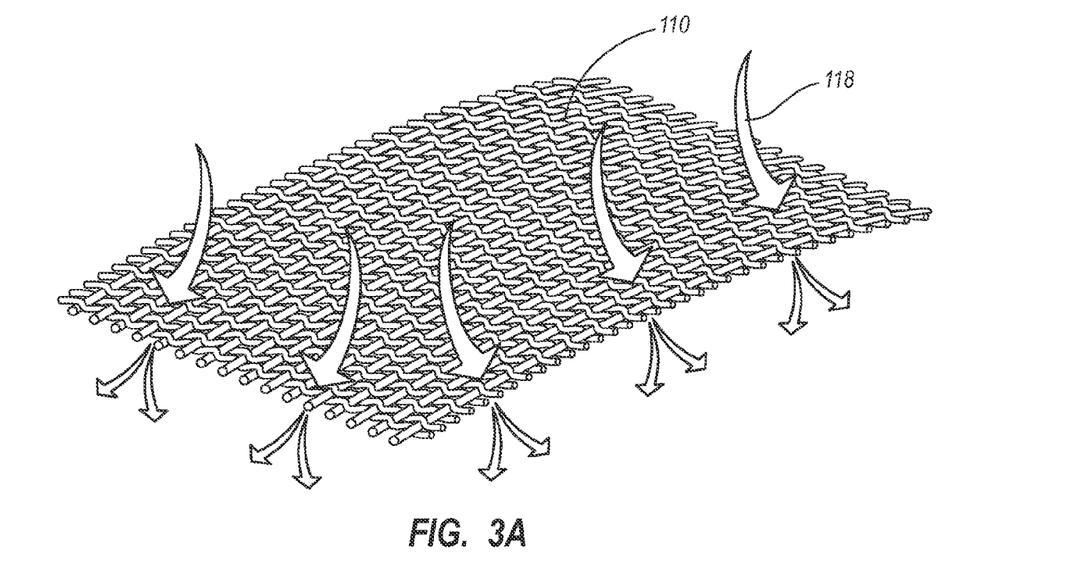
FIG. 3A is a close-up cutaway perspective view of a portion of the inflatable curtain cushion of FIG. 1 without stop leak material.

FIG. 3A is a close-up cutaway perspective view of a portion of inflatable cushion 110 of the embodiment of FIG. 1. Inflation gas 118 (depicted as arrows) may escape through apertures, which are defined by spaces between the waft and warp threads, which form the woven material from which curtain cushion 110 is manufactured.

Figure 3B:
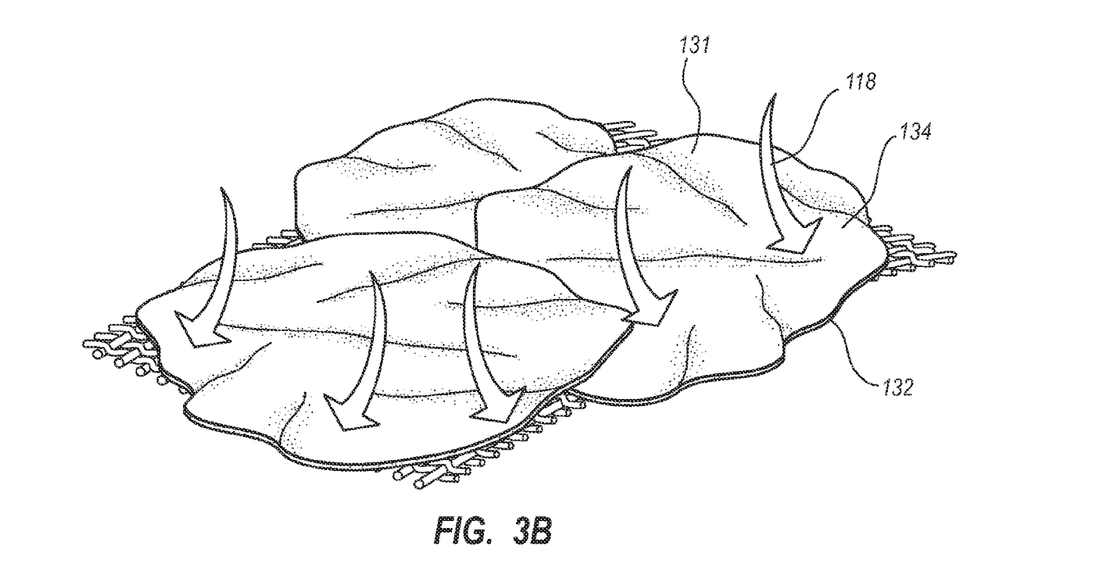
FIG. 3B is a close-up cutaway perspective view of a portion of the inflatable curtain cushion of FIG. 1 with stop leak material.

FIG. 3B is a close-up view of a portion of inflatable curtain cushion 110 of FIG. 1, wherein particles 131 of stop leak material 130 are partially blocking the apertures in cushion 110. Since stop leak material 130 becomes suspended in inflation gas during airbag deployment, as inflation gas exits through the apertures, the stop leak particles are drawn toward apertures through which inflation gas is exiting. Stop leak material particles may also block apertures in curtain cushion 110 created during weaving, by sewing, between stitches, or generated during curtain cushion 110 deployment.

Figure 4:
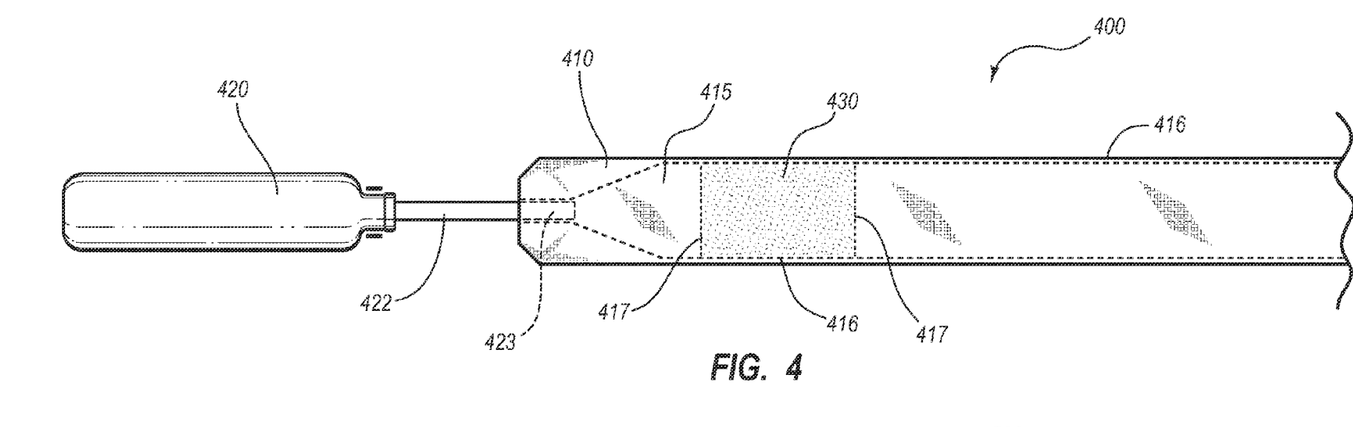
FIG. 4 is a side elevation view of a portion of an inflatable curtain cushion assembly.

FIG. 4 is a side elevation view of a portion of another embodiment of an inflatable cushion assembly. Inflatable curtain cushion assembly 400 is depicted prior to assembly in a vehicle and may comprise an inflator 420, an inflatable curtain cushion 410, and stop leak material 430. Inflator 420 may further comprise at least one inflator tube 422, and cushion 420 may further comprise at least one throat portion 415. Throat portion 415 may be partially defined by stitching 416 and is configured to channel inflation gas from an inflator to inflation cells of inflatable curtain cushion 410.

Inflator tube 422 further comprise a curtain cushion proximal end 423, which comprises an aperture that may be defined by the inner surface of inflator tube 422, wherein the aperture is positioned within the lumen of tube 422 through which inflation gas passes during inflator activation. End 423 may be disposed within throat portion 415, or in embodiments of curtain 410 that lack a throat portion, end 423 may be disposed within an inflatable void within curtain 410.

Stop leak material 430 may comprise a particulate material with similar physical properties as stop leak material 130, described above. Stop leak material 430 is disposed in an inflation gas path of travel and is secured in place with tear stitching 417. Stop leak material 430 may be disposed at one or more locations along throat portion 415, may be disposed upstream with regard to the path of inflation gas of an opening or openings for inflation cells of curtain 410.

Upon detection of a collision or roll-over event, sensors may activate the inflator of inflatable curtain cushion assembly 400, which rapidly generates or releases inflation gas. Inflation gas may travel via inflator tube 422 and enter curtain cushion 410 via throat portion 415. Upon encountering the seam formed by tear stitching 417, gas pressure may increase until tear stitching 417 is ruptured. Upon tear stitching 417 rupture, stop leak material 430 may become gas-borne and carried along with the inflation gas, thereby being distributed throughout the inflatable portions of curtain cushion 410 such as throat portion 415 and inflation cells (not shown).

Figure 5:
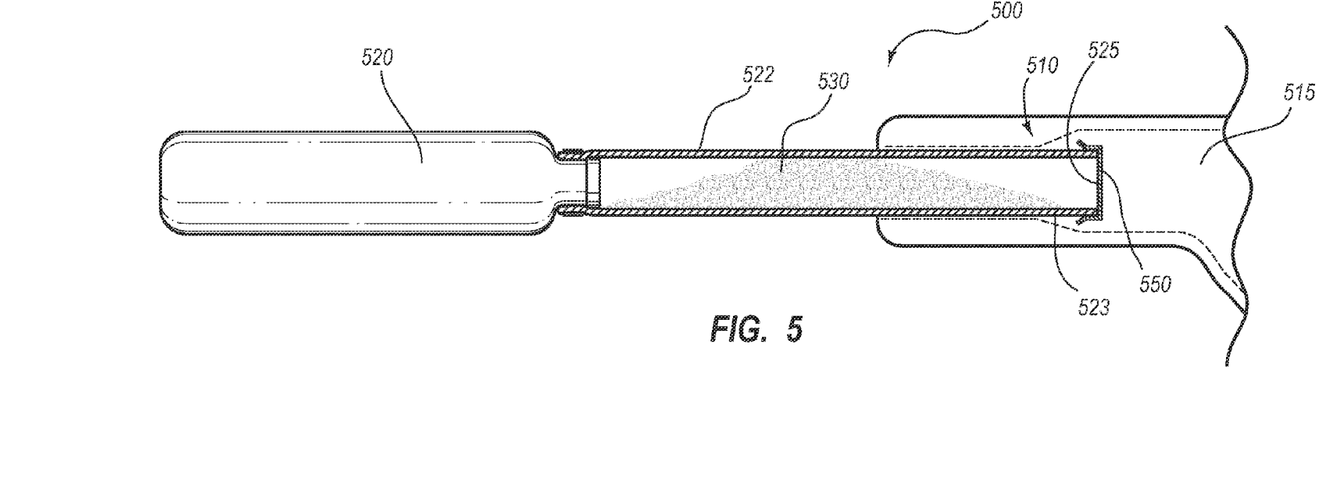
FIG. 5 is a side elevation view of a portion of another embodiment of an inflatable curtain cushion assembly.

FIG. 5 depicts another embodiment of an inflatable cushion assembly 500 from a side elevation cutaway view. Assembly 500 may comprise an inflatable curtain cushion 510, an inflator 520, stop leak material 530, and an inflator tube cover 550. Inflator 520 may comprise at least one inflator tube 522 and cushion 510 may further comprise a throat portion 515.

Inflatable curtain cushion 510 may be configured similarly to inflatable curtain cushion 110 of FIG. 1, including throat portion 115, and these components may also be configured to function similarly to similar components of inflatable curtain cushion assembly 100.

Inflator 520 may be configured similarly to inflator 120 of FIG. 1, including comprising at least one gas guide 522, and these components may be configured to function similarly to similar components of inflatable curtain cushion assembly 100. Inflator tube 522 may further comprise a throat portion proximal end 523, which may comprise an aperture 525, which is defined by the inner surface of inflator tube 522. Aperture 525 is positioned within the lumen of tube 522 through which inflation gas passes during inflator activation. Throat portion proximal end 523 may be described as an inflatable curtain cushion proximal end in embodiments that use an inflatable curtain cushion lacking a throat portion.

Stop leak material 530 may have similar physical properties as stop leak material 130 of inflatable curtain cushion assembly 100. However, in the embodiment of FIG. 5, stop leak material 530 is disposed in a different location compared to stop leak material 130 as shown in FIG. 1.

Stop leak material 530 may be freely disposed within inflator tube 522. Stop leak material 530 may be blocked from exiting end 523 of inflator tube 522 before inflator 520 activation by an inflator tube cover 550. Cover 550 may comprise an adhesive that coats all or part of cover 550 such that cover 550 may be attached to the outside of end 523 without the use of hardware.

Alternatively, cover 550 may comprise an elasticized portion such that cover 550 is retained on end 523 via contraction of the elasticized portion around inflator tube 522 at end 523. In other embodiments, the cover may be retained on 523 by a separate component, such as a tie, wire, zip-tie, clip, or clamp, although these couplers may be integrated into cover 550. Further, cover 550 may be glued to the end 523, or cover 550 may comprise a deformable material which may be deformed or crimped around the outside of end 523. Finally, a combination of the above components and/or techniques may be utilized to attach or couple cover 550 over end 523.

In other alternative embodiments, cover 550 may comprise a frangible material or a tear seam such that upon activation of inflator 520, cover 550 is at least partially ruptured. Cover 550 may be configured such that upon a build-up of inflation gas pressure, cover 550 is displaced from end 523, or may undergo a combination of rupturing and displacement. Cover 550 may be configured to remain coupled to inflator tube 522 during and after activation of inflator 520 such that cover 550 is not carried down the path of inflation gas as it travels away from inflator tube 522. Cover 550 may comprise a foil, paper, tissue, fabric, metal, plastic, or other suitable material. Cover 550 may be of any shape. In yet another alternative embodiment, cover 550 may comprise a diffuser such as diffuser 880 described in FIG. 8.

Upon activation of inflator 520 inflation gas is generated or released and rapidly flows through inflator tube 522 toward end 523. Stop leak material 530 is disposed in the flow path of the inflation gas and because stop leak material is configured to become temporarily dispersed and suspended when in the path of inflation gas during inflatable curtain cushion deployment, stop leak material 530 may be carried along with the inflation gas. As inflation gas, or stop leak material, or a combination of the two encounter cover 550, cover 550 may be displaced, ruptured, or both. As inflation gas fills curtain cushion 510, stop leak material 530 may be carried along with the inflation gas, thereby filling curtain cushion with stop leak 530 particles.

Figure 6A:
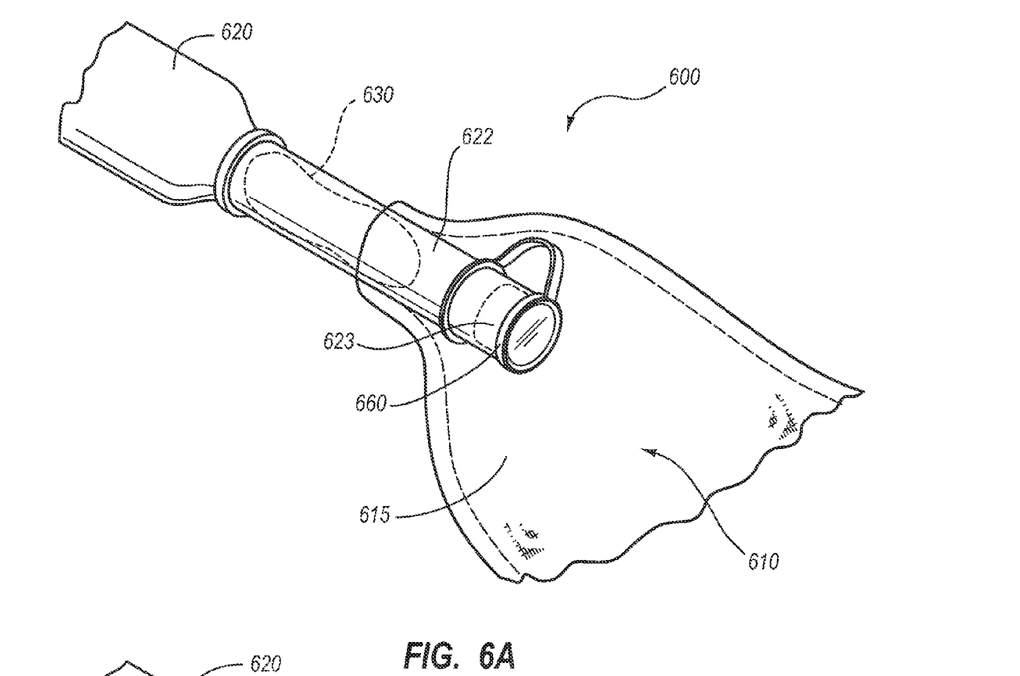
FIG. 6A is a side elevation view of a portion of another embodiment of an inflatable curtain cushion assembly before an inflator is activated.

FIG. 6A is a perspective view of another embodiment of an inflatable cushion assembly 600 prior to deployment. Cushion assembly 600 may comprise an inflatable curtain cushion 610, an inflator 620, stop leak material 630, and an inflator tube plug 660. Inflator 620 may comprise at least one inflator tube 622 and cushion 610 may further comprise a throat portion 615.

Inflatable curtain cushion 610 may be configured similarly to inflatable curtain cushion 110 of FIG. 1, including throat portion 615, and these components may also be configured to function similarly to similar components of inflatable curtain cushion assembly 100.

Inflator 620 may be configured similarly to inflator 120 of FIG. 1, including the at least one gas guide 622, and these components may be configured to function similarly to similar components of inflatable curtain cushion assembly 100. Inflator tube 622 may further comprise a throat portion proximal end 623, which may comprise an aperture, which is defined by the inner surface of inflator tube 622, wherein the aperture is contiguous with the void through which inflation gas passes during inflator activation.

Stop leak material 630 may have similar physical properties as stop leak material 130 of inflatable curtain cushion assembly 100, described in FIG. 1. Stop leak material 630 may be freely disposed within inflator tube 622. Stop leak material 630 may be blocked from exiting end 632 before inflator 620 activation by an inflator tube plug 660.

Inflator tube plug 660 may be configured similarly to inflator tube cover 550, including all the applicable alternative embodiments of cover 550. Inflator tube plug 660 is configured such that some portion of plug 660 is received by the aperture that is defined by tube end 623, and may be described as being inside inflator tube 622. Plug 660 may comprise a piece of cork, plastic, rubber, cardboard, paper, tissue, or any other suitable material. Inflator plug 660 may be configured such that a portion of plug 660 is disposed outside tube 622. For example, a rim of plug 660 may abut a rim of inflator tube end 623. Alternatively, plug 660 may be disposed completely within tube 622.

Figure 6B:
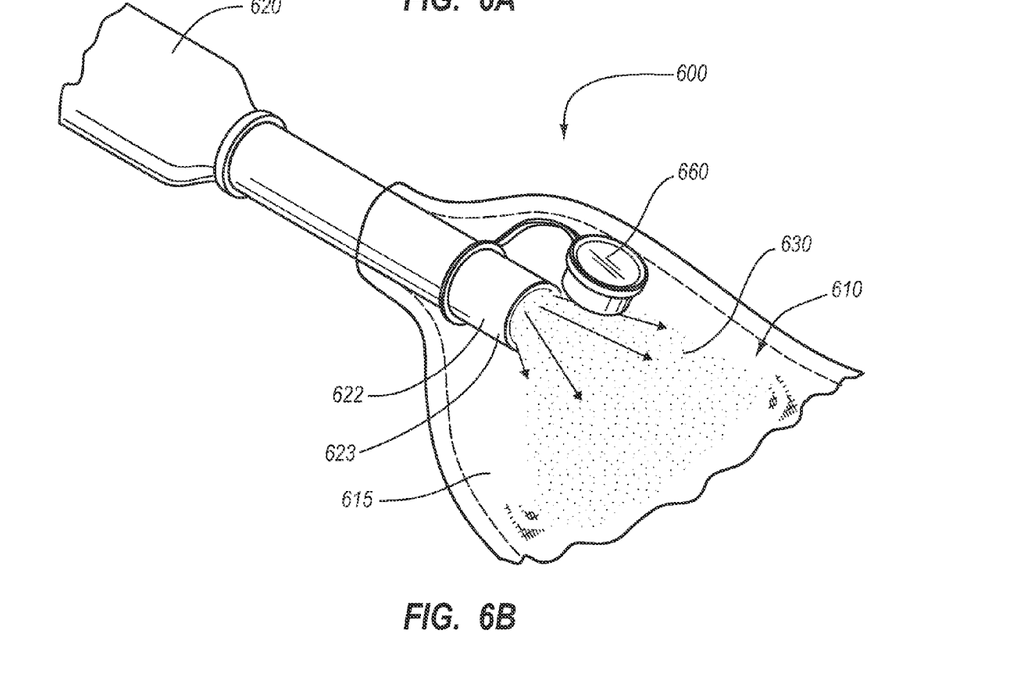
FIG. 6B is a side elevation view of a portion of the assembly of FIG. 6A after the inflator is activated.

FIG. 6B is a perspective view of the inflatable curtain cushion assembly 600 of FIG. 6A, after deployment. Upon activation of inflator 620, inflation gas is generated or released and rapidly flows through inflator tube 622 toward end 623. Stop leak material 630 is disposed in the path of inflation gas flow and because stop leak material is configured to become temporarily dispersed and suspended when in the path of inflation gas during inflatable curtain cushion deployment, stop leak material 630 may be carried along with the inflation gas. As inflation gas, or stop leak material, or a combination of the two encounter plug 660, plug 660 may be displaced, ruptured, or both. As inflation gas fills curtain cushion 610, stop leak material 630 may be carried along with the inflation gas, thereby filling curtain cushion with stop leak 630 particles.

Plug 660 may be coupled to inflator tube 622, such that upon displacement or rupture during cushion 610 deployment, plug 660 is not released into throat portion 615, but remains coupled to inflator tube 622. Alternatively, plug 660 may become displaced during inflatable curtain cushion 610 deployment such that plug 660 does not remain coupled to inflator tube 622.

Figure 7:
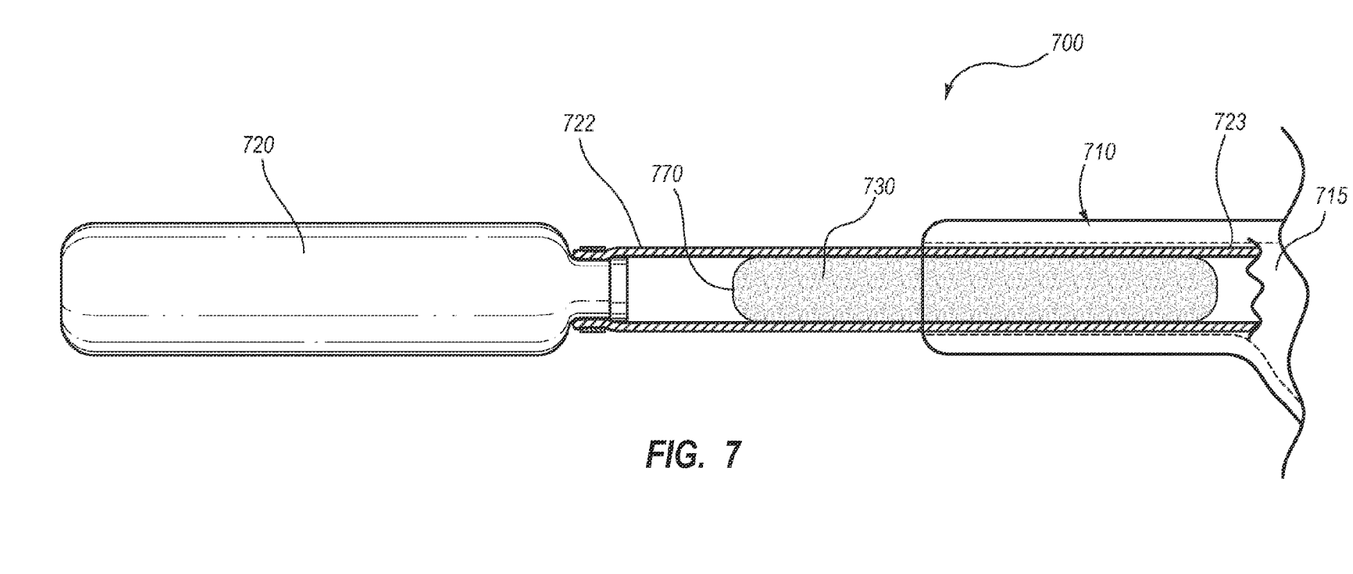
FIG. 7 is a side elevation view of a portion of another embodiment of an inflatable curtain cushion assembly.

FIG. 7 is another embodiment of an inflatable cushion assembly 700 prior to deployment. Cushion assembly 700 may comprise an inflatable curtain cushion 710, an inflator 720, stop leak material 730, and a stop leak material wrapper 770. Inflator 720 may comprise at least one inflator tube 722 and cushion 710 may further comprise a throat portion 715. Cushion assembly 700 and the components that it comprises may be configured similarly and may function similarly to cushion assembly 100, shown in FIG. 1.

Inflator tube 722 further comprise a curtain cushion proximal end 723, which comprises an aperture that may be defined by the inner surface of inflator tube 722, wherein the aperture is positioned within the lumen of tube 722 through which inflation gas passes during inflator activation. End 723 may be disposed within throat portion 715, or in embodiments of curtain 710 that lack a throat portion, end 723 may be disposed within an inflatable void curtain 710.

Stop leak material 730 may have similar physical properties as stop leak material 130 of inflatable curtain cushion assembly 100, described in FIG. 1. In the embodiment depicted in FIG. 7, stop leak material 730 is wrapped and retained within inflator tube 722 by wrapper, 770 such that stop leak material 730 may not exit tube 722 prior to curtain 710 deployment. Wrapper 770 may comprise a frangible material, such as a fabric, which may or may not comprise a tear seam, cellophane, plastic, organic or inorganic paper, tissue, or any other suitable material. Wrapper 770 may comprise a single contiguous piece of material, which is wrapped or folded around stop leak material 730 such that stop leak material 730 may be retained within wrapper 770 prior to curtain cushion 710 deployment. Alternatively, wrapper 770 may comprise two or more pieces of material coupled together by gluing, sewing, RF welding, or any other suitable technique, wherein wrapper 770 is folded around stop leak material 730. In yet another embodiment, wrapper 770 may form a tube-like structure wherein stop leak material 730 is poured into wrapper 770, and wherein wrapper 770 may then be closed on the formerly open end such that material 730 is retained prior to cushion 710 deployment.

Wrapper 770 may be placed within inflator tube 722 without being coupled to tube 722, or alternatively, wrapper 770 may be attached or coupled to inflator tube 722 by gluing, affixing with hardware, using hooks and loops, or some other suitable technique. Wrapper 770 may be fully placed within inflator tube 722 such that no part of wrapper 770 extends past a throat portion proximal end of inflator tube 722. Alternatively, a portion of wrapper 770 may extend past the throat portion proximal end of inflator tube 722 such that a portion of wrapper 770 is disposed within throat portion 715. In yet another embodiment, wrapper 770 may be fully disposed within throat portion 715, such that no part of wrapper 770 is within inflator tube 722. Wrapper 770 filled with stop leak material 730 may substantially fill the aperture and length of inflator tube 722 as depicted in FIG. 7, or in alternative embodiments, the stop leak material filled wrapper 722 may only fill a portion of the aperture and length of inflator tube 722.

Wrapper 770 is configured to allow for dispersal of stop leak material 730 upon inflatable curtain cushion 715 deployment such that stop leak material 730 may be dispersed throughout the inflatable portions of curtain 715, as described in previous embodiments herein. Dispersal may be achieved by the force of inflation gas rushing past wrapper 770 causing the rupture of the frangible material which may comprise wrapper 770. Alternatively, a portion of wrapper 770 may be coupled to a surface of inflatable curtain cushion 715, wherein the surface expands during deployment such that wrapper 770 is ruptured. In yet another embodiment, wrapper 770 may be forced by inflation gas against an object or surface, thereby causing wrapper 770 to rupture.

Figure 8:
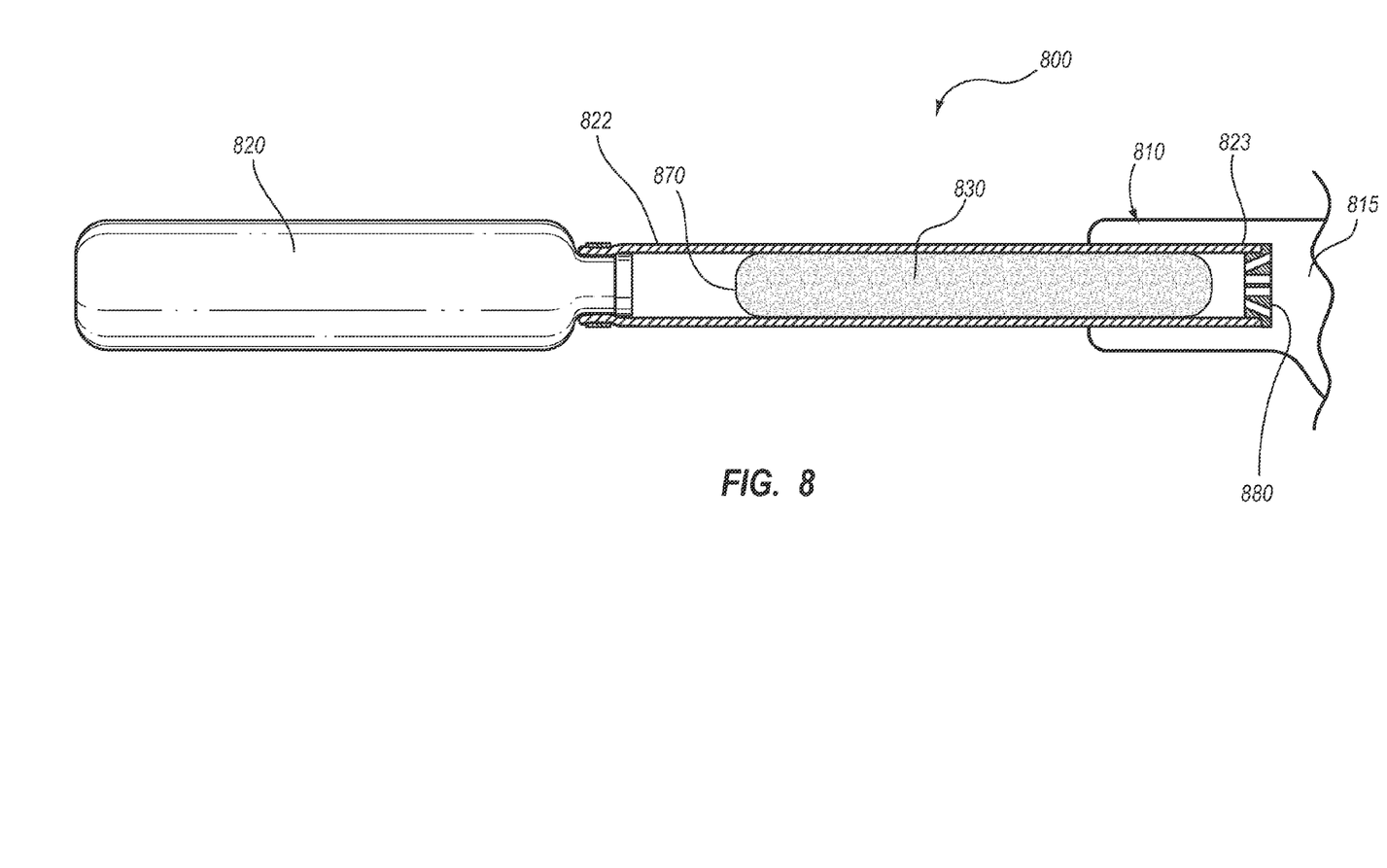
FIG. 8 is a side elevation view of a portion of another embodiment of an inflatable curtain cushion assembly.

FIG. 8 is a side elevation view of another embodiment of an inflatable cushion assembly 800. Assembly 800 is similar to assembly 700, described above and in FIG. 7, and may comprise all the components of assembly 700, except that assembly 800 may further comprise a diffuser 880 and wrapper 870 is fully disposed within inflator tube 822.

Diffuser 880 may be of any of the types well known in the art, and may comprise a piece of plastic, metal, or some other suitable material. Diffuser 880 may be attached to inflator tube 822 at curtain proximal end 823 by being threaded onto tube 822, or by gluing, welding, crimping, an interference fit, a friction fit, or any other suitable technique. In alternative embodiments, diffuser 880 may be coupled to inflator tube 822 via an adapter, and diffuser 880 may further comprise two or more pieces of metal, plastic, or any other suitable material. Diffuser 880 may comprise one or more vent holes, which may be oriented in any direction.

As with previous embodiments, inflatable curtain cushion 810 may lack throat portion 815, or the throat portion may be very short. In such embodiments, diffuser 880 may extend directly into an inflatable portion of cushion 810, such as an inflation cell. Wrapper 870 and stop leak material 830 may be configured similarly as in the embodiment described in FIG. 7 and associated text, above.

Upon inflator 820 activation, inflation gas may at least partially rupture wrapper 870 or may force wrapper 870 against diffuser 880 such that wrapper 870 is at least partially ruptured. In either case, a portion of stop leak material 830 is released from wrapper 870, and passed through diffuser 880 via vent holes. Diffuser 880 is configured to assist in the dispersal of stop leak material 830. The vent holes of diffuser 880 may be of several different sizes and different orientations, such that more stop leak material is distributed in one or more predetermined directions.

Figure 9:
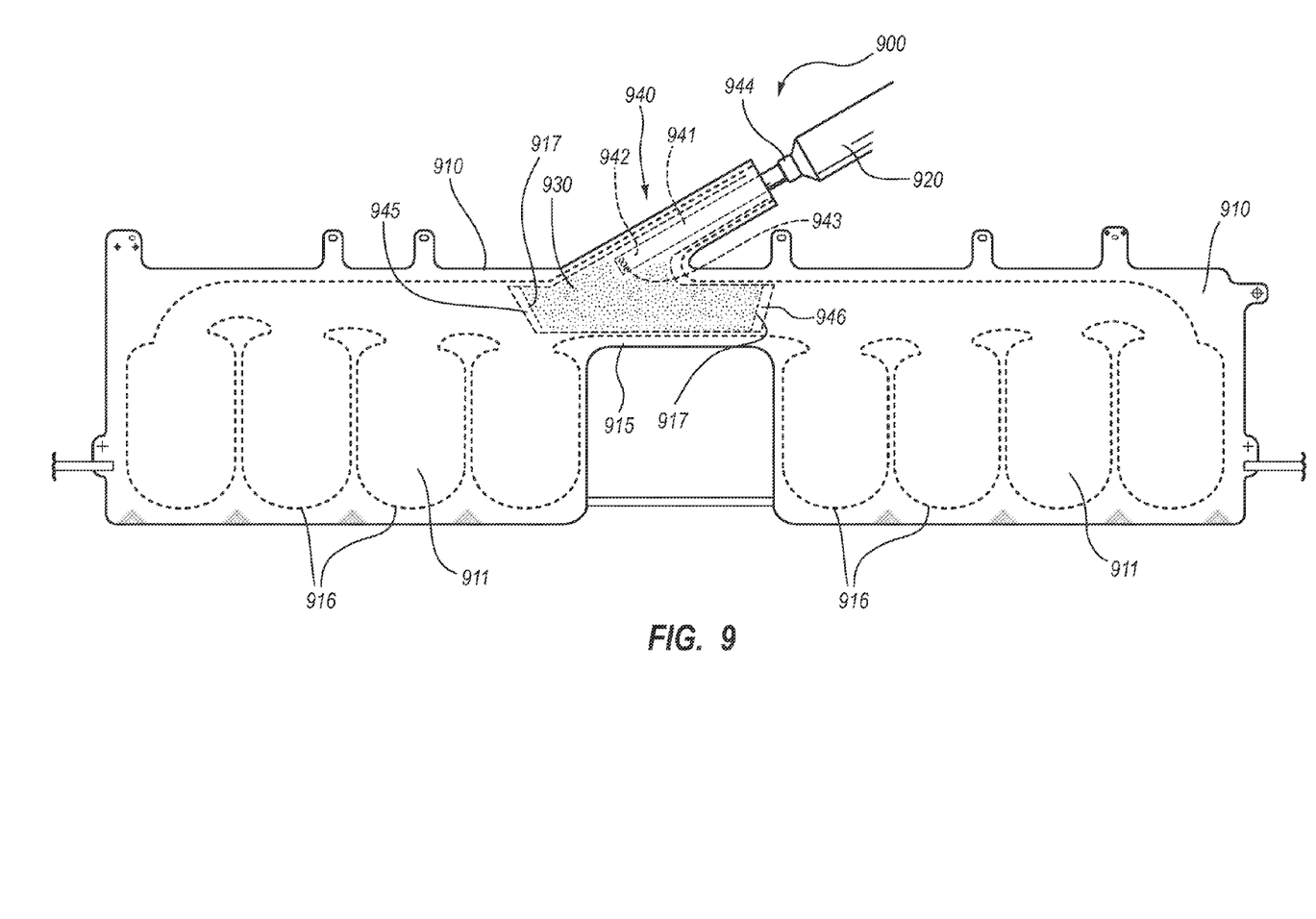
FIG. 9 is a side elevation view of another embodiment of an inflatable curtain cushion assembly.

FIG. 9 depicts an inflatable cushion assembly 900 from a side elevation view, wherein the assembly is depicted prior to assembly in a vehicle. Assembly 900 may be configured similarly to and may be configured to function similarly as inflatable curtain cushion assembly 100 (depicted in FIG. 1 and associated text) except where the following description varies from the description of assembly 100.

Assembly 900 may comprise an inflator 920, stop leak material 930, and an inflatable curtain cushion 910. Cushion 910 may further comprise one or more inflation cells 911, one or more throat portions 915, and one or more throat liners 940. Inflation cells 911 and throat portion 915 may at least be partially defined by a seam 916, which may be formed by stitching. However, in some embodiments, the inflation cells, the throat portion, or the entire cushion may be manufactured using a one-piece-woven technique or some other technique for sealing the cushion, and therefore, may not comprise stitching. Collectively, throat portions 915 and inflation cells 911 form an inflatable void.

Throat liner 940 may comprise a separate member than cushion 910 and may be sewn into cushion 910, or alternatively, throat liner 940 may be integral to cushion 910 such that it does not comprise a separate member. Throat liner 940 comprises an inflator tube 941, an inflator coupler 944, a first exit 945 and a second exit 946. Inflator tube 941 may further comprise an inflatable cushion proximal end 942 and a diffuser 943. Coupler 944 typically comprises a metal and/or plastic member that is configured to fluidly attach inflator 920 to throat liner 940 by the inflator being crimped around the coupler or threading onto the coupler. Coupler 944 may comprise an extension of inflator tube 941. Throat liner 940 may also comprise tear stitching 917, which retains stop leak material 930 within throat liner 940 prior to inflator 920 activation and inflatable curtain cushion 910 deployment. Tear stitching may be said to form a pocket within which stop leak material 930 is sequestered; however, the configurations of tear stitching 917, first aperture 945, and second aperture 946 as depicted in FIG. 9 are for illustrative purposes only and may be varied according to different applications. For example, first and second exits 945 and 946 may each comprise one or more apertures from which inflation gas and stop leak material 930 can escape during airbag cushion deployment. Also, tear stitching 917 may define a non-linear configuration as depicted in FIG. 9; for example, tear stitching 917 may comprise a semi-circle.

Tear stitching 917 and stop leak material 930 are at least partially located on a path of travel for inflation gas, wherein the path begins at inflator 920, continues through inflator tube 941 of throat liner 940, throat portion 915, and ends at an inflator distal end of inflation cell 911. Thus before inflator 920 activation, the path of travel for inflation gas and is at least partially interrupted by tear stitching 917. One skilled in the art will appreciate that in addition to tear stitching a number of types and configurations of reversible sealing techniques may be employed to retain the stop leak material in a predetermined position prior to inflator activation and cushion deployment. Such techniques include gluing, using a seam sealant, or RF welding.

Upon activation of inflator 920, the force of inflation gas may at least partially rupture tear seams 917 such that stop leak material 930 is dispersed into inflation cells 911. As with all previous embodiments, a predetermined amount of stop leak material 930 has been placed in inflatable curtain cushion assembly 900 to effectively reduce the porosity of cushion 910 to inflation gas. Specifically, a predetermined amount of stop leak material 930 has been placed in throat liner 940 and is retained within the liner prior to inflator 920 activation by tear stitching 917. Thus, upon airbag deployment stop leak material 930 may become gas-born and dispersed throughout the inflatable void of cushion 910, thereby being carried to gas leaks in the cushion. If the aperture through which inflation gas is leaking is of such a size that one or more stop leak 930 particles can plug or cover the aperture, then the amount of gas leaking through the aperture may be reduced.

Figure 10:
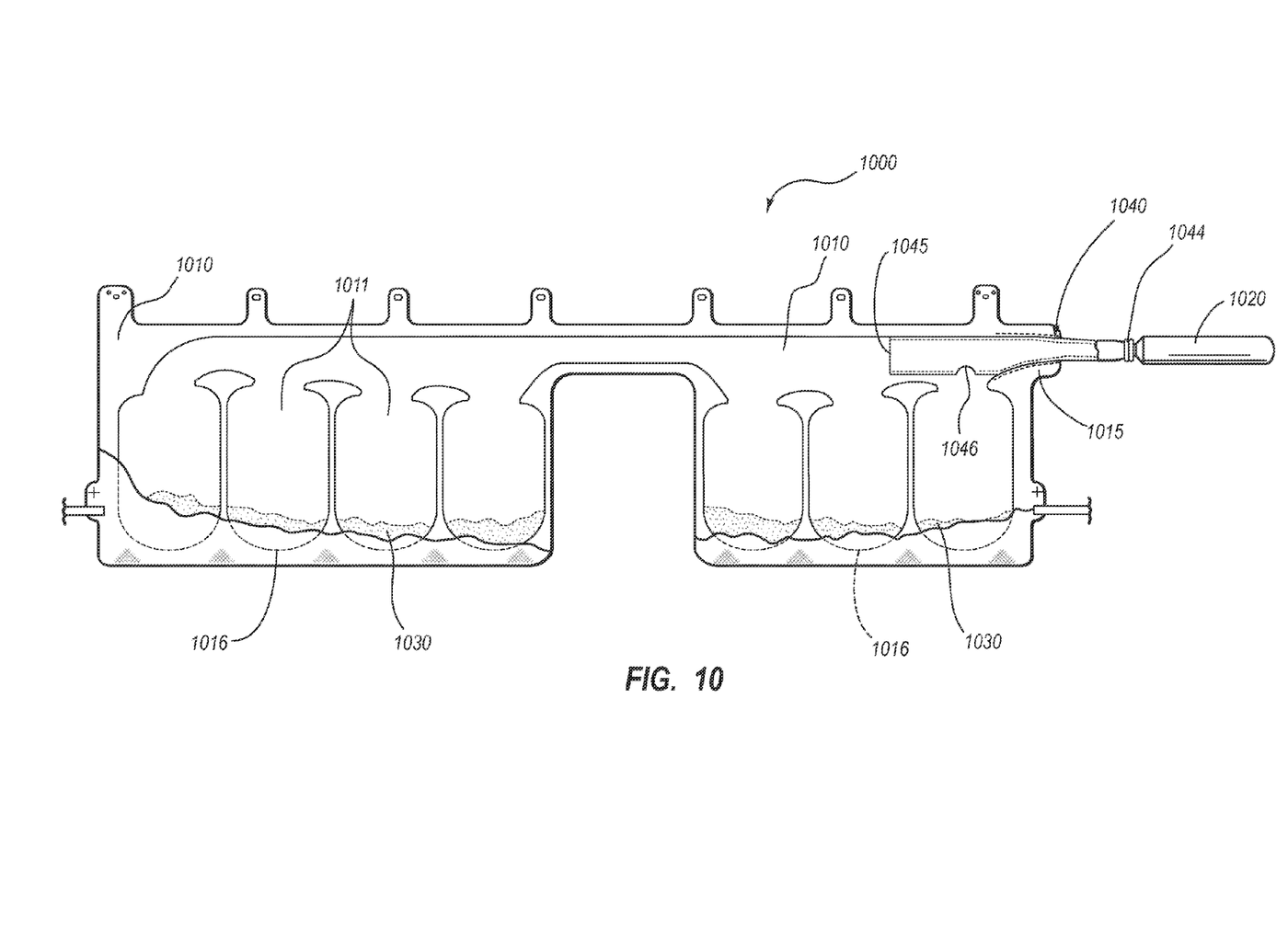
FIG. 10 is a side elevation partial cutaway view of another embodiment of an inflatable airbag cushion assembly; and, FIG. 11 is a side elevation partial cutaway view of another embodiment of an airbag cushion assembly.

FIG. 10 depicts an inflatable curtain cushion assembly 1000 from a side elevation view. Assembly 1000 may be configured similarly to and may be configured to function similarly as inflatable curtain cushion assemblies disclosed herein, except where the following description varies from the descriptions of those previous assemblies. Cushion assembly 1000 may comprise an inflatable cushion 1010, an inflator 1020, and a throat liner 1040. Cushion 1010 is depicted in an extended configuration, such as prior to being rolled, folded, or both rolled and folded; alternatively cushion 1010 could have previously been deployed. Cushion 1010 comprises an inflatable void, which may be divided into inflation cells 1011 as well as one or more throat portions 1015. The inflatable void may be defined by a seam 1016, which may comprise stitching, a heat or chemical sealed portion, or adhesive; however, cushion 1010 may be manufactured using a one piece woven technique, wherein the inflatable void may or may not be defined by a seam. The inflatable void extends from one or more inflator-proximal throat portions 1015 of cushion 1010, which act as gas conduits that fluidly connects inflator 1020 to inflation cells 1011. Throat liner 1040 may be located within the inflatable void of throat portion 1015.

Throat liner 1040 may comprise an inflator coupler 1044, a first exit 1045 and a second exit 1046. Liner 1040 may comprise the same or similar fabric as that from which cushion 1010 is manufactured, and may be attached to throat portion 1015 by seam 1016, or an additional seam. First and second exits 1045 and 1046 are configured in a predetermined manner such inflation gas enters cushion 1010 with predetermined characteristics. In the depicted embodiment, first exit 1045 comprises an aperture defined by the shape of an inflator-distal end of throat liner 1040; whereas second exit 1046 comprises a circular aperture, which may be cut into the throat liner. Second exit 1046 appears to be semi-circular in FIG. 10 because the figure is a side elevation view and the second exit is located on a bottom portion of throat liner 1040.

Inflator 1020 may be of any type known to one skilled in the art and is directly attached to throat liner 1040, wherein the inflator does not have an inflator tube. Inflator 1020 may comprise an extension around which a portion of coupler 1044 is crimped. In an alternative embodiment, inflator 1020 comprises a portion that is crimped around coupler 1044. In yet another embodiment, a portion of inflator 1020 may be received by throat liner 1040, wherein coupler 1044 does not protrude from the liner, as depicted in FIG. 10.

One skilled in the art will appreciate that a variety of types and techniques of attachment may be employed to couple inflator 1020 and throat liner 1040. For example, as discussed above, throat liner 1040 may be crimped onto inflator 1020, or alternatively, the inflator may be crimped onto the throat portion, wherein a portion of the inflator is bent or manipulated such that a portion of the throat liner is captured. Other techniques and mechanisms include using a band, clasp, clip, coupler, adhesive, stitching, RF welding, or any other suitable technique or mechanism.

Additionally, one skilled in the art will recognize that a variety of shapes and configurations of throat liners may be used to connect an inflator with an airbag cushion such that the inflator can inflate the cushion. For example, the throat liner may comprise a throat portion which is an extension of a back panel of a front or side airbag cushion. Additionally, the throat portion and/or liner may be located at any suitable location on an airbag cushion.

Stop leak material 1030 may be configured similarly to those embodiments disclosed herein, and in the embodiment of FIG. 10, is freely disposed within the inflatable void of cushion 1010. Prior to packaging and installation into a vehicle, stop leak material 1030 may be primarily disposed within inflation cells 1011, or may be spread throughout the inflatable void of cushion 1010, including throat portion 1015 and throat liner 1040. Stop leak material 1030 is configured to become widely dispersed within cushion 1010 upon activation of inflator 1020 and the rapid deployment of the airbag cushion.

Figure 11:
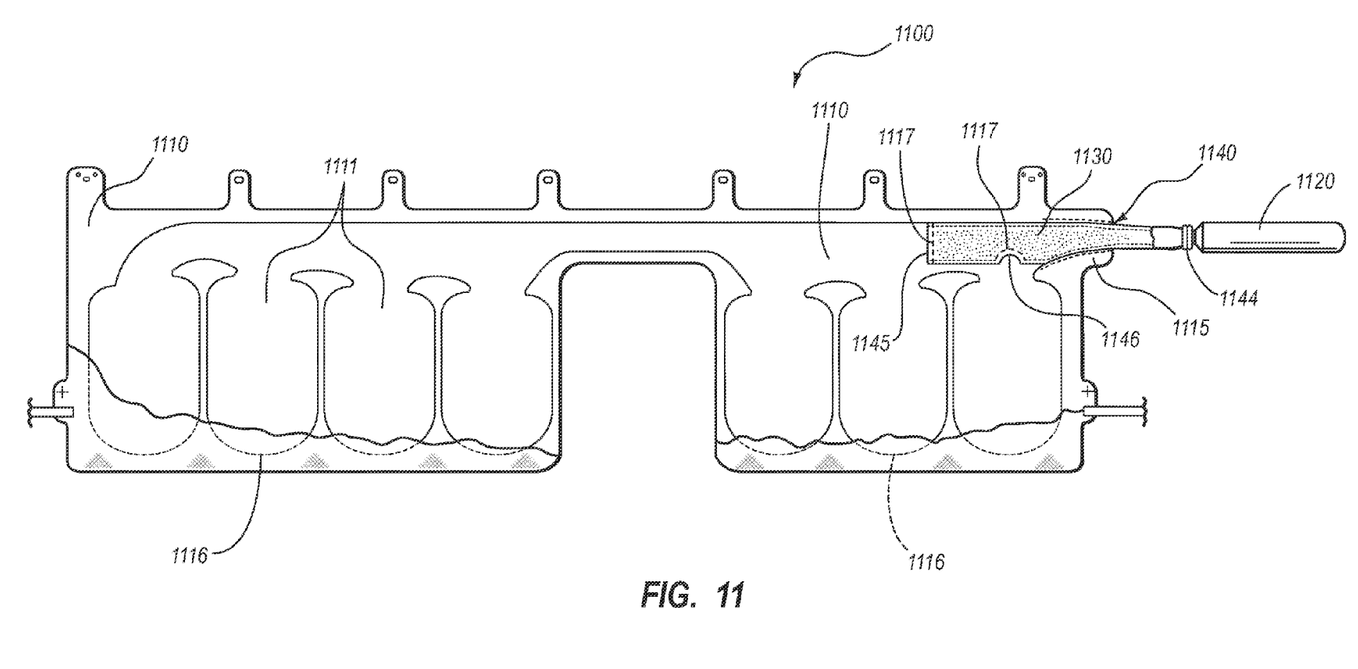

FIG. 11 depicts an inflatable curtain cushion assembly 1100 from a side elevation view. Assembly 1100 may be configured similarly to and may be configured to function similarly as inflatable curtain cushion assemblies disclosed herein, except where the following description varies from the descriptions of those previous assemblies. Cushion assembly 1100 may comprise an inflatable cushion 1110, an inflator 1120, and a throat liner 1140.

Cushion assembly 1100 is configured such that stop leak particles 1130 are retained within throat liner 1140 prior to cushion 1110 deployment. Upon inflator 1120 activation, stop leak material 1130 becomes gas-born and is distributed throughout cushion 1110. Cushion 1110 is depicted in an extended configuration, such as prior to being rolled, folded, or both rolled and folded; alternatively cushion 1110 could have previously been deployed. Cushion 1110 comprises an inflatable void, which may be divided into inflation cells 1111 as well as one or more throat portions 1115.

Throat liner 1140 may be configured similarly as throat liner 1040, wherein the throat liner may comprise a coupler 1144, a first exit 1145, and a second exit 1146. Throat liner 1140 may further comprise at least one set of tear stitching 117 such that the throat liner may retain stop leak material 1130 prior to inflator 1120 activation. Upon inflator 1120 activation, tear stitching is configured to allow stop leak material 1130 to exit throat liner 1140 such that the stop leak material can be distributed throughout the inflatable void of cushion 1110. Throat liner 1140 is configured to be fluidly coupled to inflator 1120 without the use of an inflator tube that is disposed between the inflator and the throat liner. In an alternative embodiment, an inflator tube and/or diffuser may be located at least partially within throat liner 1140.

The methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Without further elaboration, it is believed that one skilled in the art can use the preceding description to utilize the invention to its fullest extent. The examples and embodiments disclosed herein are to be construed as merely illustrative and not a limitation of the scope of the present invention in any way. It will be apparent to those having skill in the art that changes may be made to the details of the above-described embodiments without departing from the underlying principles of the invention. In other words, various modifications and improvements of the embodiments specifically disclosed in the description above are within the scope of the appended claims. The scope of the invention is therefore defined by the following claims. Note also that elements recited in means-plus-function format are intended to be construed in accordance with 35 U.S.C. §112 ¶6.

The invention claimed is:

1. An inflatable cushion assembly comprising:
   an inflator configured to generate inflation gas in response to predetermined conditions;
   an inflatable cushion coupled to, and in fluid communication with the inflator, the inflatable cushion comprising opposing sides which define a void for receiving the inflation gas, wherein the sides each comprise a woven material;
   particulate stop leak material disposed within the inflatable cushion assembly, wherein the particles of stop leak material comprise one or more substances, and a majority of the particles comprise a planar shape, the particles of stop leak material being configured to become dispersed by and temporarily suspended in the inflation gas during inflatable cushion deployment such that the particles of stop leak material are at least partially distributed throughout the inflatable void in the inflatable cushion, the particles of stop leak material being configured to reduce the porosity of the cushion.

2. The inflatable cushion assembly of claim 1, wherein before the inflator is activated the stop leak material is disposed within the inflatable cushion.

3. The inflatable cushion assembly of claim 1, wherein the assembly further comprises at least one inflator tube coupled to the inflator and configured to channel inflation gas from the inflator to the inflatable cushion.

4. The inflatable cushion assembly of claim 3, wherein before activation of the inflator, the stop leak material is disposed within the at least one inflator tube.

5. The inflatable cushion assembly of claim 1, wherein the inflatable cushion further comprises a throat liner that is attached directly to the inflator such that the throat portion fluidly connects the inflator with the void of the inflatable cushion.

6. The inflatable cushion assembly of claim 5, wherein the throat liner comprises tear stitching that is configured to close at least one throat liner exit such that before inflator activation the stop leak material is retained within the throat liner and wherein after inflator activation, the tear stitching is at least partially ruptured such that the stop leak material can enter the inflatable cushion via the throat liner exit.

7. The inflatable cushion assembly of claim 6, wherein the throat liner comprises two exits that are closed by tear stitching such that prior to inflator activation the stop leak material is retained within the throat liner, and wherein after inflator activation, the tear stitching at least partially ruptures such that inflation gas and the stop leak material can enter the inflatable cushion via the exits.

8. The inflatable cushion assembly of claim 5, wherein the throat liner comprises an inflator tube that is located within the throat liner, the inflator tube comprising:
   a first end; and,
   a second end, wherein the second end comprises a coupler that is configured to allow the inflator and the inflator tube to be fluidly coupled.

9. The inflatable cushion assembly of claim 8, wherein before inflator activation, the stop leak material is located within and retained within the inflator tube, and after inflator activation the stop leak material exits the inflator tube.

10. The inflatable cushion assembly of claim 5, wherein the inflatable cushion comprises an inflatable curtain cushion.

11. The inflatable cushion assembly of claim 1, wherein the stop leak material comprises particles of a mesh size range of between 6 and 100.

12. The inflatable cushion assembly of claim 11, wherein the stop leak material comprises particles of a mesh size range of between 8 and 30.

13. The inflatable cushion assembly of claim 1, wherein the stop leak material comprises particles with a ratio of length to thickness of greater than 10:1.

14. The inflatable cushion assembly of claim 1, wherein the stop leak material remains suspendable after exposure to cycling between −40° C. and +107° C.

15. The inflatable cushion assembly of claim 1, wherein the stop leak material comprises particles of mica flake.

16. The inflatable cushion assembly of claim 1, wherein the stop leak material coats an inside surface of the inflatable cushion thereby at least partially blocking at least one aperture in the inflatable cushion.

17. The inflatable cushion assembly of claim 16, wherein the at least one aperture comprises apertures located between threads of the woven material of the inflatable cushion.

18. The inflatable cushion assembly of claim 16, wherein the at least one aperture comprises apertures located between stitches which define a seam in the inflatable cushion and the woven material that defines the inflatable cushion.

19. An inflatable cushion assembly comprising:
an inflator configured to generate inflation gas in response to predetermined conditions;
an inflatable cushion fluidly coupled to the inflator, wherein the inflatable cushion comprises a membrane that defines an inflatable void, the inflatable cushion further comprising;
at least one inflation cell that partially defines the inflatable void; and,
particles of stop leak material, wherein the particles comprises one or more substances, and wherein the particles of stop leak material are configured to become at least partially dispersed within the inflatable cushion such that the particles may at least partially block inflation gas leaks in the inflatable cushion such that the porosity of the inflatable cushion to inflation gas is reduced;
wherein the stop leak particles are at least partially located along a path of inflation gas travel such that upon inflator activation, the inflation gas temporarily suspends the particles and at least partially disperses the particles within the inflatable void of the cushion membrane;
wherein the inflatable cushion further comprises tear stitching configured to retain the stop leak material particles in the path of inflation gas travel, wherein the tear stitching is located at a portion of the inflation cell through which inflation gas may pass to inflate the inflation cell, wherein the tear stitching at least partially ruptures after inflator activation such that the stop leak material is carried into and dispersed within the inflation cell by the inflation gas.

20. The inflatable cushion assembly of claim 19, wherein the particles of stop leak material become dispersed due to the inflatable cushion membrane changing conformation from a packaged state to a deployed state.

21. The inflatable cushion assembly of claim 19, further comprising:
a throat portion that partially defines the inflatable void; and
at least one throat liner that couples the inflator to the inflatable void,
wherein at least a portion of the throat liner is located within the throat portion of the inflatable cushion.

22. The inflatable cushion assembly of claim 21, wherein prior to inflator activation, the stop leak particles are located within the throat liner and are retained within the throat liner by the tear stitching that closes one or more exits of the throat liner, and wherein upon inflator activation, the tear stitching at least partially ruptures such that the inflation gas and the stop leak particles may enter the inflatable void of the cushion membrane via the one or more exits.

23. The inflatable cushion assembly of claim 21, wherein the throat liner further comprises an inflator tube that is located at least partially within the throat liner, and wherein before inflator activation, the particles of the stop leak material are located within the inflator tube.

24. The inflatable cushion assembly of claim 19, wherein the inflatable cushion comprises an inflatable curtain cushion.

25. The inflatable cushion assembly of claim 19, wherein the substance that comprises the stop leak particles is mica.

26. The inflatable cushion assembly of claim 19, wherein before assembly, the inflatable cushion is coated with a substance other than the stop leak material to reduce the porosity of the inflatable cushion.

27. An inflatable cushion assembly comprising:
an inflator configured to generate gas in response to predetermined conditions;
an inflatable cushion inflatably coupled to the inflator, the inflatable cushion comprising a membrane, which defines an inflatable void which receives inflation gas from the inflator, wherein the membrane comprises at least one inflation cell;
at least one inflator tube coupled to the inflator and extending to the inflatable cushion, the inflator tube configured to channel inflation gas from the inflator to the inflatable cushion; and,
stop leak material particles freely disposed within the at least one inflator tube, the majority of stop leak material particles comprising a planar shape, the stop leak material particles configured to become temporarily dispersed by and suspended in the inflation gas during inflatable deployment such that the stop leak material particles are at least partially distributed throughout the inflatable void of the at least one inflatable cushion inflation cell, the stop leak material configured to reduce the porosity of the cushion.

28. The inflatable cushion assembly of claim 27, wherein the inflatable cushion comprises an inflatable curtain cushion.

29. The inflatable cushion assembly of claim 27, wherein the assembly further comprises a throat liner that is attached to the inflatable cushion membrane and at least partially receives the at least one inflator tube.

30. The inflatable cushion assembly of claim 27, wherein the stop leak material particles comprise mica particles.

31. The inflatable cushion assembly of claim 27, wherein an inflatable cushion proximal end of the at least one inflator tube is obstructed such that the stop leak material particles are prevented from exiting the inflator tube prior to inflator activation, however upon inflator activation, an obstruction is at least partially removed by the force of inflation gas, thereby allowing the dispersal of the stop leak material particles.

32. The inflatable cushion assembly of claim 27, wherein an obstruction comprises a thin foil adhesive component disposed on the outside of the inflator tube and covering an aperture that comprises the interior void of the inflator tube.

33. The inflatable cushion assembly of claim 27, wherein an obstruction comprises a plug, which fits within an inflatable cushion-proximal aperture of the inflator tube.

34. The inflatable cushion assembly of claim 27, wherein an obstruction comprises a cap that fits over an aperture in the inflator tube, wherein the aperture is disposed on an inflatable cushion-proximal end of the inflator tube.

35. The inflatable cushion assembly of claim 27, wherein the inflator tube further comprises a diffuser disposed on the at least one inflatable cushion throat portion.

36. The inflatable cushion assembly of claim 27, wherein the stop leak material is wrapped and retained by a wrapper, which is disposed within the inflator tube.

* * * * *